US009808676B2

(12) United States Patent
Sullivan et al.

(10) Patent No.: US 9,808,676 B2
(45) Date of Patent: Nov. 7, 2017

(54) GOLF BALL LAYERS PRODUCED USING CROSSLINKED HIGHLY-NEUTRALIZED POLYMER MATERIALS

(71) Applicant: Acushnet Company, Fairhaven, MA (US)

(72) Inventors: Michael J. Sullivan, Old Lyme, CT (US); Mark L. Binette, Mattapoisett, MA (US); Robert Blink, Newport, RI (US); David A. Bulpett, Boston, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/525,753

(22) Filed: Oct. 28, 2014

(65) Prior Publication Data

US 2016/0114216 A1 Apr. 28, 2016

(51) Int. Cl.
| *A63B 37/12* | (2006.01) |
| *C08L 23/08* | (2006.01) |
| *C08K 5/103* | (2006.01) |
| *C08K 5/09* | (2006.01) |
| *C08K 5/098* | (2006.01) |
| *C08J 3/24* | (2006.01) |
| *A63B 37/00* | (2006.01) |
| *A63B 45/00* | (2006.01) |
| *C08K 5/00* | (2006.01) |

(52) U.S. Cl.
CPC ...... *A63B 37/0054* (2013.01); *A63B 37/0023* (2013.01); *A63B 37/0043* (2013.01); *A63B 37/0051* (2013.01); *A63B 37/0062* (2013.01); *A63B 37/0075* (2013.01); *A63B 45/00* (2013.01); *C08J 3/24* (2013.01); *C08K 5/00* (2013.01); *C08K 5/09* (2013.01); *C08K 5/098* (2013.01); *C08K 5/103* (2013.01); *C08L 23/0876* (2013.01)

(58) Field of Classification Search
None
See application file for complete search history.

(56) References Cited

U.S. PATENT DOCUMENTS

| 5,118,763 A | 6/1992 | Aoki et al. ................. 525/332.8 |
| 5,697,856 A * | 12/1997 | Moriyama ......... A63B 37/0003 473/374 |
| 6,967,229 B2 * | 11/2005 | Voorheis ............ A63B 37/0003 473/371 |
| 2004/0092636 A1* | 5/2004 | Gajic ....................... C08K 3/22 524/406 |
| 2004/0242802 A1* | 12/2004 | Voorheis ............ A63B 37/0003 525/386 |
| 2005/0037866 A1* | 2/2005 | Emerson ............ A63B 37/0003 473/371 |
| 2007/0238552 A1* | 10/2007 | Kim .................... A63B 37/0003 473/371 |
| 2009/0124413 A1* | 5/2009 | Sullivan ............. A63B 37/0059 473/373 |
| 2011/0130220 A1* | 6/2011 | Ichikawa ........... A63B 37/0003 473/376 |
| 2011/0143863 A1* | 6/2011 | Sullivan ............. A63B 37/0043 473/376 |
| 2011/0143864 A1* | 6/2011 | Sullivan ............. A63B 37/0031 473/376 |
| 2012/0309560 A1* | 12/2012 | Sullivan ................. A63B 37/02 473/373 |
| 2014/0183786 A1* | 7/2014 | Kim .................... A63B 37/0075 264/278 |
| 2014/0187350 A1* | 7/2014 | Nanba ................ A63B 37/0039 473/372 |

OTHER PUBLICATIONS

Dalton, Jeff, *Compression by Any Other Name, Science and Golf IV, Proceedings of the World Scientific Congress of Golf* (Eric Thain ed., Routledge, 2002) ("J. Dalton").
Office Action dated Nov. 28, 2016 of corresponding Japanese Patent Application No. 2015-210352.

* cited by examiner

*Primary Examiner* — David Buttner
(74) *Attorney, Agent, or Firm* — Smith, Gambrell & Russell, LLP

(57) ABSTRACT

The invention relates to golf balls having at least one layer formed from a highly-neutralized polymer material that has been crosslinked. In particular, the compositions of the invention include a highly-neutralized polymer, at least one crosslinking initiator, and at least one coagent. The invention also relates to methods of making the compositions and golf ball constructions that incorporate the compositions of the invention in at least a portion thereof.

15 Claims, No Drawings

GOLF BALL LAYERS PRODUCED USING CROSSLINKED HIGHLY-NEUTRALIZED POLYMER MATERIALS

FIELD OF THE INVENTION

The present invention relates to golf balls, and more particularly to golf balls having at least one layer formed from a highly-neutralized polymer material that has been crosslinked.

BACKGROUND OF THE INVENTION

Golf ball manufacturers have been able to vary a wide range of playing characteristics, such as compression, velocity, and spin, by altering the composition of the golf ball. Depending on the layer and desired performance, golf ball layers may be constructed with a number of polymeric compositions and blends, including polybutadiene rubber, polyurethanes, polyamines, and ethylene-based ionomers. For example, thermoset polymers, in particular, are used extensively by golf ball manufacturers to form centers and intermediate layers with high resiliency. The resiliency of these thermoset layers is improved by the addition of a coagent prior to curing, usually in combination with a peroxide initiator.

More recently, ionomers and highly-neutralized polymers have been found to be suitable materials for golf ball layers. The ionomers provide relatively hard inner covers having a high flexural modulus and good resiliency which allows the balls to reach a high speed when struck by a club and travel greater distances. By increasing the amount of neutralization of the acid groups, ionomers become stiffer and offer better properties. However, the processability of thermoplastic ionomers is problematic as the percent of neutralization of the acid group increases. For example, as the percent of neutralization increases, the melt flow of the ionomer becomes too low and the ease of processability decreases. As such, the use of currently available thermoplastic ionomers is limited with respect to golf ball layers.

Accordingly, there remains a need for ionomer compositions that are neutralized at high percentages, but in a manner that still allows the use of the resultant polymer compositions in golf ball layers. Advantageously, the compositions of the present invention provide golf ball layers having enhanced resiliency, durability, and compression.

SUMMARY OF THE INVENTION

The present invention is directed to a golf ball including a cover layer; an inner core layer formed from a composition including a highly-neutralized polymer material having an acid polymer containing ethylene, a $C_{3-8}$ $\alpha,\beta$-ethylenically unsaturated carboxylic acid, and a softening monomer; an organic acid or salt thereof; and a cation source present in an amount sufficient to neutralize at least 80% of all acid groups; at least one crosslinking initiator including a peroxide, a high energy radiation source, or a carbon-carbon initiator; and at least one coagent including a metal salt of an unsaturated fatty acid; and an outer core layer disposed between the inner core layer and the cover layer. In one embodiment, the cation source is present in an amount sufficient to neutralize at least 90% of all acid groups. For example, the cation source is present in an amount sufficient to neutralize 100% of all acid groups.

In this aspect, the $C_{3-8}$ $\alpha,\beta$-ethylenically unsaturated carboxylic acid is selected from acrylic acid, methacrylic acid, ethacrylic acid, maleic acid, crotonic acid, fumaric acid, or itaconic acid. In one embodiment, the coagent is zinc diacrylate ("ZDA"), zinc dimethacrylate ("ZDMA"), or mixtures thereof. In another embodiment, the acid polymer is selected from ethylene/(meth)acrylic acid/n-butyl acrylate, ethylene/(meth)acrylic acid/methyl acrylate, or ethylene/(meth)acrylic acid/ethyl acrylate.

In another aspect of the invention, the high energy source includes electron beams, ultra-violet radiation, gamma radiation, X-ray radiation, infrared radiation, heat, or combinations thereof. In addition, the carbon-carbon initiator has the following general structure:

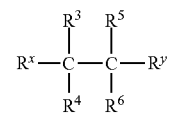

where each of $R_3$, $R_4$, $R_5$, and $R_6$ independently may be hydrogen, substituted and unsubstituted straight, branched, and cyclic, hydrocarbons (including aromatic hydrocarbons), and each of $R_x$ and $R_y$ independently may be substituted and unsubstituted aromatic hydrocarbons.

The present invention is also directed to a golf ball including a core formed from a composition including a highly-neutralized polymer material having an acid polymer including ethylene, a $C_{3-8}$ $\alpha,\beta$-ethylenically unsaturated carboxylic acid, and a softening monomer; a non-acid polymer; an organic acid or salt thereof; and a cation source present in an amount sufficient to neutralize at least 90% of all acid groups; and at least one crosslinking initiator including a peroxide; and a cover. In one embodiment, the composition further includes at least one coagent.

In this aspect, the non-acid polymer is selected from polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, or alkyl acrylate rubbers. In one embodiment, the peroxide is selected from dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; or benzoyl peroxide. In another embodiment, the softening monomer is an alkyl acrylate and methacrylate, where the alkyl groups have from 1 to 8 carbon atoms. In yet another embodiment, the core has a hardness of about 50 Shore C to about 85 Shore C.

The present invention is further directed to a method of forming a golf ball including preparing a highly-neutralized polymer having at least 80 percent of neutralized acid groups; mixing the highly-neutralized polymer with a crosslinking initiator and a coagent to form a blend; providing a portion of a golf ball mold; injecting the blend into the golf ball mold; and curing the blend to form a golf ball layer around the golf ball portion. In one embodiment, the coagent is in the form of a liquid. In another embodiment, the golf ball layer is an outer core layer having a hardness of about 50 Shore C to about 85 Shore C.

In this aspect of the invention, the step of preparing a highly-neutralized polymer further includes feeding at least one acid polymer into a melt extruder; and adding a cation source in an amount sufficient to neutralize at least 80% of all acid groups. In another embodiment, the step of mixing the highly-neutralized polymer further includes soaking the highly-neutralized polymer in the liquid coagent. In yet another embodiment, the step of injecting further includes injection molding, retractable pin injection molding, reaction injection molding (RIM), or liquid injection molding (LIM).

DETAILED DESCRIPTION OF THE INVENTION

The present invention is directed to golf balls including at least one layer formed from a highly neutralized polymer ("HNP") composition that has been covalently crosslinked. In particular, the compositions of the invention include at least a highly-neutralized polymer material and a crosslinking agent. In one embodiment, crosslinking agent may include a crosslinking initiator. In another embodiment, the crosslinking agent may be a mixture of the crosslinking initiator and coagent. In yet another embodiment, the compositions of the invention may include a melt flow modifier.

The present invention also explores the methods of making such compositions. In one embodiment, a crosslinking agent is mixed with the thermoplastic HNP to form a layer. The crosslinking agent may include a crosslinking initiator and, optionally, a coagent. The ability to mix the HNP material at low temperatures makes it possible to add the crosslinking agent without setting off the cure. Once in the desired form or layer, the uncured HNP and crosslinking agent may be cured in a similar manner as a thermoset material. The resulting crosslinked HNP material provides advantageous properties including an increase in coefficient of restitution and durability when used in golf ball layers. In addition, the crosslinked HNP provides for improved stability of physical properties over time and at elevated temperatures.

Accordingly, the present invention is further directed to golf ball constructions that incorporate the compositions of the invention in at least a portion thereof. The compositions of the invention provide an alternative for a golf ball manufacturer to use on a traditional ionomer-covered ball or urethane-covered ball. Without being bound to any particular theory, it is believed that by adding a crosslinking agent to a HNP thermoplastic, the cured golf ball layer formed from the mixture will have higher resiliency and compression than that of an untreated HNP layer. As such, golf balls of the present invention, e.g., golf balls including core layers and intermediate layers, formed from the compositions of the invention, may replace conventional golf balls.

The Composition

Highly-Neutralized Polymer

The present invention includes the use of highly-neutralized polymer ("HNP") materials. The HNPs of the present invention are ionomers and/or their acid precursors that are preferably neutralized, either fully or partially, with organic acid copolymers or the salts thereof. In one embodiment, the acid moieties are neutralized greater than about 80 percent, more preferably greater than about 90 percent, and most preferably at least about 100 percent.

In one embodiment of the present invention, the acid copolymers used to make the HNPs are copolymers of an $\alpha$-olefin and a $C_{3-8}$ $\alpha,\beta$-ethylenically unsaturated carboxylic acid, optionally including a softening monomer. The acid copolymers of the present invention may be described as E/X/Y copolymers. E is an alkylene. In one embodiment, E is ethylene or propylene, preferably ethylene. X is a $\alpha,\beta$-ethylenically unsaturated carboxylic acid. The acid is preferably selected from (meth)acrylic acid, ethacrylic acid, maleic acid, crotonic acid, fumaric acid, and itaconic acid. In one embodiment, the acid is (meth)acrylic acid. As used herein, the term "(meth)acrylic" includes both methacrylic and acrylic. Y is a softening comonomer. In one embodiment, Y is alkyl acrylate, methacrylate, or a combination thereof, where the alkyl groups have from 1 to 8 carbon atoms.

The acid polymers of the present invention may include an $\alpha$-olefin in an amount of about 15 weight percent or greater, preferably about 25 weight percent or greater, more preferably about 40 weight percent or greater, and even more preferably about 60 weight percent or greater, based on the total weight of the acid polymer. The acid polymers of the present invention may include the carboxylic acid in an amount from about 1 to about 40 weight percent, preferably about 5 to about 30 weight percent, and more preferably about 10 to about 20 weight percent, based on the total weight of the acid polymer. If included, the softening monomer may be present in the acid polymer in an amount from about 0 to about 50 weight percent, preferably from about 5 to about 25 weight percent, and more preferably from about 10 to about 20 weight percent, based on the total weight of the acid polymer.

Suitable acid copolymers include, but are not limited to, those wherein the $\alpha$-olefin is ethylene, the acid is (meth)acrylic acid, and the optional softening monomer is methacrylate, n-butyl(meth)acrylate, isobutyl(meth)acrylate, methyl(meth)acrylate, or ethyl(meth)acrylate. In one embodiment, the HNPs include acid polymers selected from the group consisting of ethylene/(meth)acrylic acid/n-butyl acrylate, ethylene/(meth)acrylic acid/methyl acrylate, ethylene/(meth)acrylic acid/ethyl acrylate, and combinations thereof.

In another embodiment of the present invention, the acid copolymers may be blended with non-acid polymers. For example, an E/X copolymer may be blended with an E/Y copolymer. In this aspect, the E/X copolymer, where E is ethylene and X is a $\alpha,\beta$-ethylenically unsaturated carboxylic acid, is blended with the E/Y copolymer, where E is ethylene and Y is a softening comonomer, preferably alkyl acrylate and methacrylate, where the alkyl groups have from 1 to 8 carbon atoms. Any of the $\alpha,\beta$-ethylenically unsaturated carboxylic acids discussed above with regard to the E/X/Y copolymers are suitable for producing the blends.

The acid copolymers may also be blended with other non-acid polymers including elastomeric polymers. For example, an E/X copolymer may be blended with an E/R copolymer. In this aspect, the E/X copolymer, where E is ethylene and X is a $\alpha,\beta$-ethylenically unsaturated carboxylic acid, is blended with the E/R copolymer, where E is ethylene and R is a monomer that when polymerized with ethylene creates an elastomeric polymer. Any of the $\alpha,\beta$-ethylenically unsaturated carboxylic acids discussed above with regard to the E/X/Y copolymers are suitable for producing the blends.

Suitable non-acid polymers include, but are not limited to, ethylene-alkyl acrylate polymers, particularly polyethylene-butyl acrylate, polyethylene-methyl acrylate, and polyethylene-ethyl acrylate; metallocene-catalyzed polymers; ethylene-butyl acrylate-carbon monoxide polymers and ethylene-vinyl acetate-carbon monoxide polymers; polyethylene-vinyl acetates; ethylene-alkyl acrylate polymers containing a cure site monomer; ethylene-propylene rubbers and ethylene-propylene-diene monomer rubbers; olefinic ethylene elastomers, particularly ethylene-octene polymers, ethylene-butene polymers, ethylene-propylene polymers, and ethylene-hexene polymers; styrenic block copolymers; polyester elastomers; polyamide elastomers; polyolefin rubbers, particularly polybutadiene, polyisoprene, and styrene-butadiene rubber; and thermoplastic polyurethanes. In a preferred embodiment, the non-acid polymers include polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, and alkyl acrylate rubbers.

In this aspect of the invention, the non-acid polymers may be present in the HNPs of the present invention in an amount of about 5 weight percent to about 80 weight percent, preferably about 10 weight percent to about 40 weight percent, and more preferably about 15 weight percent to about 25 weight percent.

The acid copolymers of the present invention may be prepared from "direct" acid copolymers, copolymers polymerized by adding all monomers simultaneously, or by grafting at least one acid-containing monomer onto an existing polymer. In one embodiment, the acid copolymers employed in the present invention to make the HNPs are "direct" acid copolymers.

The HNPs of the present invention are formed by reacting the acid polymer with a sufficient amount of cation source, in the presence of an organic acid or salt thereof, such that at least about 80 percent, preferably at least about 90 percent, more preferably at least about 95 percent, and even more preferably about 100 percent, of all acid groups present are neutralized. In one embodiment, the cation source is present in an amount sufficient to neutralize, theoretically, greater than about 100 percent. For example, the cation source may be present in an amount sufficient to neutralize greater than about 110 percent. In another embodiment, the cation source is present in an amount sufficient to neutralize greater than about 200 percent of the acid groups. In still another embodiment, the cation source is present in an amount sufficient to neutralize greater than about 250 percent of all acid groups present.

Without being bound to any particular theory, it has been found that by adding sufficient organic acid or salt thereof to the acid copolymer, the HNP can be neutralized without losing processability to a level much greater than for a metal cation. In this aspect, the acid polymer can be reacted with the organic acid or salt thereof and the cation source simultaneously, or the acid polymer can be reacted with the organic acid or salt thereof prior to the addition of the cation source. For example, an ethylene α,β-ethylenically unsaturated carboxylic acid copolymer may be melt-blended with an organic acid or a salt of organic acid, and a sufficient amount of a cation source may be added to increase the level of neutralization of all the acid moieties (including those in the acid copolymer and in the organic acid) to greater than about 90 percent, preferably greater than about 100 percent. However, any method of neutralization available to those of ordinary skill in the art may also be suitably employed.

Suitable cation sources include, but are not limited to, metal ions and compounds of alkali metals, alkaline earth metals, and transition metals; metal ions and compounds of rare earth elements; and combinations thereof. In one embodiment, the cation sources for use in the present invention include metal ions and compounds of magnesium, sodium, potassium, cesium, calcium, barium, manganese, copper, zinc, tin, lithium, and rare earth metals.

Suitable organic acids include, but are not limited to, aliphatic and mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic or dimerized derivatives thereof. It is preferred that the organic acids and salts of the present invention are relatively non-migratory, i.e., they do not bloom to the surface of the polymer under ambient temperatures, and non-volatile, i.e., they do not volatilize at temperatures required for melt-blending. The presence of double bonds in unsaturated or multi-unsaturated organic acids may allow for the organic acid or salt to participate in the crosslinking, further reducing volatility and migration. In one embodiment, the HNP includes an organic acid salt in an amount of 20 phr or greater, preferably 30 phr or greater, more preferably 40 phr or greater.

Crosslinking Agent

As briefly set forth above, the HNPs of the present invention are blended with a crosslinking agent. In one embodiment, crosslinking agent may include a crosslinking initiator. In another embodiment, the crosslinking agent may be a mixture of the crosslinking initiator and coagent.

The crosslinking initiators suitable for use with the present invention may be any known polymerization initiators that produce free radicals during the curing cycle. Suitable initiators include, but are not limited to, peroxides, high energy radiation sources capable of generating free radicals, carbon-carbon initiators, and combinations thereof.

Suitable high energy radiation sources capable of generating free radicals include, but are not limited to, electron beams, ultra-violet radiation, gamma radiation, X-ray radiation, infrared radiation, heat, and combinations thereof. In one embodiment, a photoinitiator is used in conjunction with an ultra-violet radiation cure.

Suitable peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. In this aspect of the present invention, the peroxide may be used alone, or in combination with a coagent, to promote the crosslink reaction. In addition to peroxides, other free radical initiators suitable for use with the present invention include persulfates, azo compounds, benzophenones, hydrazides, and combinations thereof.

The crosslinking initiators contemplated for use with the present invention also include carbon-carbon initiators. As would be understood by those of ordinary skill in the art, the carbon-carbon initiators are non-peroxides and are capable of thermally decomposing into carbon-based free radicals by breaking at least one carbon-carbon single bond. The carbon-carbon initiators are preferred for high temperature curing. In one embodiment, the carbon-carbon initiator is used when the composition of the present invention is molded into a golf ball component at a first temperature, and then, in a secondary step, the golf ball component is cured at a second temperature that is above the first temperature.

Suitable carbon-carbon initiators include, but are not limited to, compounds with the following general formula:

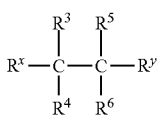

where each of $R_3$, $R_4$, $R_5$, and $R_6$ independently may be hydrogen, substituted and unsubstituted straight, branched, and cyclic, hydrocarbons (including aromatic hydrocarbons), and each of $R_x$ and $R_y$ independently may be substituted and unsubstituted aromatic hydrocarbons. In one embodiment, each of $R_3$, $R_4$, $R_5$, and $R_6$ independently may be alkyl groups. For example, each of $R_3$, $R_4$, $R_5$, and $R_6$ independently may be $C_{1-6}$ alkyl groups. In another embodiment, each $R_x$ and $R_y$ independently may be aryl groups. For example, each $R_x$ and $R_y$ independently may be phenyl groups.

Other examples of carbon-carbon initiators suitable for use in the present invention are disclosed in U.S. Pat. Nos. 6,967,229 and 5,118,763, the disclosures of which are incorporated by reference herein.

The crosslinking initiator may be present in the composition of the present invention in an amount ranging between about 0.05 phr and about 15 phr by weight of the composition. For example, in one embodiment, the amount of initiator is about 5 phr or less, preferably about 3 phr or less, more preferably about 2.5 phr or less, and even more preferably about 2 phr or less per hundred of the composition. In still another embodiment, the amount of free radical initiator is between about 0.1 phr and about 1.5 phr, more preferably between about 0.25 phr and about 0.5 phr. Those of ordinary skill in the art will understand that the total amount of initiators used will vary depending on the specific end product desired and the particular initiators employed.

As would be understood by those of ordinary skill in the art, coagents are commonly used in combination with crosslinking initiators and, more particularly, peroxides, to increase the state of the cure. When included with the crosslinking initiator in the crosslinking agent, suitable coagents include, but are not limited to, metal salts of unsaturated carboxylic acids; unsaturated vinyl compounds and polyfunctional monomers; phenylene bismaleimide; and combinations thereof.

In one embodiment, the coagent includes a metal salt of an unsaturated fatty acid. A suitable coagent for use in this aspect may be formed from an unsaturated carboxylic acid, preferably an α,β-ethylenically unsaturated carboxylic acid having about 3 to 8 carbon atoms, such as methacrylic, acrylic, itaconic, sorbic, cinnamic and crotonic acid. Suitable counterions include, but are not limited to, quaternary phosphonium or ammonium cations such as tetraalkyl phosphonium, and metal cations such as sodium, lithium, potassium, magnesium, calcium, zinc, barium, aluminum, tin, zirconium, nickel and cadmium. Zinc, magnesium and cadmium are preferred as the metal cations. As will be readily apparent to one of ordinary skill in the art, choosing an unsaturated fatty acid promotes the fatty acid, whereas choosing a saturated fatty acid promotes crosslinking of the polymer.

In one embodiment, the coagent is a mono-(meth)acrylic acid or di-(meth)acrylic acid metal salt, wherein the cation is zinc, magnesium, calcium, or mixtures thereof. For example, the coagent may be zinc diacrylate ("ZDA"), zinc dimethacrylate ("ZDMA"), or mixtures thereof. Of the common acrylate cross-linkers, ZDA has generally been found to produce golf balls with greater initial velocity than ZDMA, therefore, the former may be preferable to achieve a specific initial velocity. The ZDA can be of various grades of purity. For the purposes of this invention, the lower the quantity of zinc stearate present in the ZDA the higher the ZDA purity. Thus, ZDA containing less than about 10 percent zinc stearate is preferable. In one embodiment, ZDA containing between about 4 percent and about 8 percent zinc stearate is employed.

Other coagents suitable for use in the present invention include unsaturated vinyl compounds. Examples of unsaturated vinyl compounds include, but are not limited to, N,N'-m-phenylene dimaleimide (available as Vanax® MBM from R. T. Vanderbilt); trimethylolpropane trimethacrylate (Sartomer® SR-350 from Sartomer); triallyl trimellitate (Triam® 705 from Wako Chemicals); triallylisocyanurate (Taic® from Nippon Kasei Chemical); acrylate-terminated liquid polybutadiene (PolyBD® 300 from Elf Atochem N.A.); and mixtures thereof. In addition, poly-functional monomers, phenylene bismaleimide and sulfur may also be used as the coagent.

The present invention also contemplates the use of liquid coagents. In this aspect of the present invention, suitable coagents include, but are not limited to, trimethylolpropane trimethacrylate (Sartomer© SR-350 from Sartomer), acrylate-terminated liquid polybutadiene (PolyBD® 300 from Elf Atochem N.A.), and combinations thereof.

The compositions of the present invention include the coagent in an amount ranging from about 1 to about 60 phr by weight. In one embodiment, the coagent is used in an amount of about 5 to about 55 phr by weight. In another embodiment, the coagent is used in an amount of about 10 to about 45 phr by weight. In yet another embodiment, the coagent is used in an amount of about 15 to about 40 phr by weight. In still another embodiment, the coagent is used in an amount of about 20 to about 30 phr by weight.

Melt Flow Modifiers

The HNP compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt flow modifiers.

Additives/Fillers

The HNP compositions of the present invention also optionally include additives, fillers, and combinations thereof. In one embodiment, the additives and/or fillers may be present in an amount of from 0 weight percent to about 50 weight percent, based on the total weight of the composition. In another embodiment, the additives and/or fillers may be present in an amount of from about 5 weight percent to about 30 weight percent, based on the total weight of the composition. In still another embodiment, the additives and/or fillers may be present in an amount of from about 10 weight percent to about 20 weight percent, based on the total weight of the composition.

Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof.

Methods of Forming the Composition

The present invention is also directed to methods of forming the compositions of the present invention. The methods of the present invention are advantageous in that the HNPs can be produced at relatively low extrusion temperatures. Due to the low extrusion temperatures, the thermoplastic HNPs may be blended, and later molded, with a crosslinking initiator and coagent without setting off the cure. This allows for the crosslinking of the HNPs, which in turn, provides golf ball layers formed from the crosslinked HNPs having higher resiliency and compression values. In addition, the crosslinked HNP's improved high temperature stability facilitates the over-molding of an adjacent layer of either a thermoset or thermoplastic without distorting, melting, or deforming the HNP layer due to the temperatures required to mold the "over layer."

The methods of making the HNPs of the present invention are not limited by any particular method or equipment. In one embodiment, the HNP is prepared by simultaneously or individually feeding the acid polymer, optional melt flow modifier(s), and optional additive(s)/filler(s) into a melt extruder, such as a single or twin screw extruder. A suitable amount of cation source is then added such that at least 80 percent, preferably at least 90 percent, and more preferably at least 100 percent, of all acid groups present are neutralized. Optionally, the cation source is added in an amount sufficient to neutralize, theoretically, greater than 100 percent, preferably greater than 110 percent, more preferably greater than 200 percent, and even more preferably greater than 250 percent of all acid groups present in the composition. The acid polymer may be at least partially neutralized prior to the above process. The components are intensively mixed prior to being extruded as a strand from the die-head.

After the HNP is prepared, the HNP may be blended with the crosslinking initiator and optionally the coagent. In one embodiment, the HNP and the crosslinking initiator are blended in an extruder to form a blended composition. In another embodiment, the HNP, crosslinking initiator, and coagent are blended in an extruder to form a blended composition. The blended composition is then formed into pellets such that the material is pelletized without setting off the cure. The blended composition is maintained in this state until molding is desired. The pellets formed from the blended composition may also be soaked in a liquid initiator and coagent prior to the molding process. Soaking the pellets in a liquid coagent prior to the molding process allows for the introduction of the liquid at room temperature and allows for very accurate metering of the liquid into the solid. In this aspect of the present invention, there is very little, if any, loss due to volatilization. If necessary, further additives, such as those discussed above, may be added and uniformly mixed before initiation of the molding process. The blend is then injected into a golf ball mold. Once in desired form or layer, the uncured blend of HNP and crosslinking initiator, and optionally coagent, is cured in a similar manner as thermoset materials. Upon curing, the blend forms a cured golf ball layer. The cured golf ball layer may include a core layer, an intermediate layer, a cover layer, or combinations thereof.

The golf balls of the invention may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

Golf Ball Construction

As discussed briefly above, the compositions of the present invention may be used with any type of ball construction including, but not limited to, one-piece, two-piece, three-piece, and four-piece designs, a double core, a double cover, an intermediate layer(s), a multilayer core, and/or a multilayer cover depending on the type of performance desired of the ball. That is, the compositions of the invention may be used in a core, an intermediate layer, and/or a cover of a golf ball, each of which may have a single layer or multiple layers. In one embodiment, the compositions of the invention are formed into a core layer. In another embodiment, the compositions of the invention are formed into an intermediate layer.

Golf Ball Core Layer(s)

The core or core layer(s) may be formed from the compositions of the invention. For example, a core formed from the composition of the invention may be covered with a castable thermoset or injection moldable thermoplastic material or any of the other cover materials discussed below. The core may have a diameter of about 1.0 inches to about 1.64 inches and the cover layer thickness may range from about 0.03 inches to about 0.06 inches.

The core compression may be about 90 or less, or 80 or less, or 70 or less, or 60 or less, or 50 or less, or 40 or less, or 30 or less, or 20 or less, or a compression within a range having a lower limit of 10 or 20 or 30 or 35 or 40 and an upper limit of 50 or 60 or 70 or 80 or 90. In another embodiment, the core may have an overall compression of 40 or greater, or 50 or greater, or 60 or greater, or 70 or greater, or 80 or greater, or a compression within a range having a lower limit of 40 or 50 or 55 or 60 and an upper limit of 80.

The coefficient of restitution ("COR") of a golf ball core made according to the invention may be at least about 0.750 at 125 ft/s. In one embodiment, the COR is at least about 0.775, at least about 0.780, at least about 0.782, at least about 0.785, at least about 0.787, at least about 0.790, at least about 0.795, at least about 0.798, at least about 0.800, or at least about 0.830 or higher.

When not formed from the compositions of the invention, any core material known to one of ordinary skill in that art is suitable for use in the golf balls of the invention. In particular, the core may be solid, semi-solid, hollow, fluid-filled or powder-filled, one-piece or multi-component cores. As used herein, the term "fluid" includes a liquid, a paste, a gel, a gas, or any combination thereof; the term "fluid-filled" includes hollow centers or cores; and the term "semi-solid" refers to a paste, a gel, or the like. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. In addition, the compositions of the invention may be incorporated into the core.

Golf Ball Intermediate Layer(s)

An intermediate layer, such as an outer core layer or inner cover layer, i.e., any layer(s) disposed between the inner core and the outer cover of a golf ball may be formed from the compositions of the present invention. An intermediate layer may be used, if desired, with a multilayer cover or a multilayer core, or with both a multilayer cover and a multilayer core. As with the core, the intermediate layer may also include a plurality of layers.

In one embodiment, the intermediate layer is formed, at least in part from the compositions of the invention. For example, an intermediate layer or inner cover layer having a thickness of about 0.015 inches to about 0.06 inches may be disposed about a core. In this aspect of the invention, the core, which has a diameter ranging from about 1.5 inches to about 1.59 inches, may also be formed from a composition of the invention or, in the alternative, from a conventional rubber composition. The inner ball may be covered by a castable thermoset or injection moldable thermoplastic material or any of the other cover materials discussed below. In this aspect of the invention, the cover may have a thickness of about 0.02 inches to about 0.045 inches, preferably about 0.025 inches to about 0.04 inches.

In another embodiment, the intermediate layer is covered by an inner cover layer, either of which may independently be formed from the compositions of the invention or other material that produces the desired performance results. For example, a ball of the invention may include a center having a diameter of about 0.5 inches to about 1.30 inches. The center may be formed from a composition of the invention or any of the other core materials previously discussed. The core may be covered by an outer core layer to form a core, which also may be formed form the compositions of the invention, any of the core materials discussed above, or castable thermoset materials or injection moldable thermoplastic materials. The outer core layer may have a thickness of about 0.125 inches to about 0.500 inches. The core may then be covered with a casing layer having a thickness of about 0.015 inches to about 0.06 inches formed from a composition of the invention, a castable thermoset material or an injection moldable thermoplastic material. The outer cover layer, which preferably has a thickness of about 0.02 inches to about 0.045 inches, may be formed from a castable thermoset material or an injection moldable thermoplastic material or other suitable cover materials discussed below and known in the art.

When not formed from the compositions of the invention, the intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly(ether-amide), polyphenylene oxide resins or blends thereof, and thermoplastic polyesters.

Golf Ball Cover Layer(s)

The cover provides the interface between the ball and a club. Properties that are desirable for the cover are good moldability, high moisture resistance, high abrasion resistance, high impact resistance, high tear strength, high resilience, and good mold release, among others. The cover layer may be formed, at least in part, from a composition of the invention. However, when not formed from the compositions of the invention, the cover may be formed from one or more homopolymeric or copolymeric materials as discussed in the section above pertaining to the intermediate layer.

Golf balls according to the invention may also be formed having a cover of polyurethane, polyurea, and polybutadiene materials.

In one embodiment, the cover may have a thickness of about 0.02 inches or greater. In another embodiment, the cover may be about 0.03 inches or greater in thickness. In still another embodiment, the thickness of the cover may range from about 0.02 inches to about 0.05 inches.

Golf Ball Post-Processing

The golf balls of the present invention may be painted, coated, or surface treated for further benefits. For example, golf balls may be coated with urethanes, urethane hybrids, ureas, urea hybrids, epoxies, polyesters, acrylics, or combinations thereof in order to obtain an extremely smooth, tack-free surface. If desired, more than one coating layer can be used. The coating layer(s) may be applied by any suitable method known to those of ordinary skill in the art. Any of the golf ball layers may be surface treated by conventional methods including blasting, mechanical abrasion, corona discharge, plasma treatment, and the like, and combinations thereof.

Golf Ball Properties

The properties such as core diameter, intermediate layer and cover layer thickness, hardness, and compression have been found to affect play characteristics such as spin, initial velocity, and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight.

The preferred diameter of the golf balls is from about 1.680 inches to about 1.800 inches, more preferably from about 1.680 inches to about 1.760 inches. A diameter of from about 1.680 inches (43 mm) to about 1.740 inches (44 mm) is most preferred; however diameters anywhere in the range of from 1.700 to about 1.950 inches can be used.

Preferably, the overall diameter of the core and all intermediate layers is about 80 percent to about 98 percent of the overall diameter of the finished ball. The core may have a diameter ranging from about 0.09 inches to about 1.65 inches. In one embodiment, the diameter of the core of the present invention is about 1.2 inches to about 1.630 inches. For example, when part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

If the core has multiple layers, such multi-layer cores of the present invention have an overall diameter within a range having a lower limit of about 1.0 or about 1.3 or about 1.4 or about 1.5 or about 1.6 or about 1.61 inches and an upper limit of about 1.62 inches or about 1.63 inches or about 1.64 inches. In a particular embodiment, the multi-layer core has an overall diameter of about 1.5 inches or about 1.51 inches or about 1.53 inches or about 1.55 inches or about 1.57 inches or about 1.58 inches or about 1.59 inches or about 1.6 inches or about 1.61 inches or about 1.62 inches.

The inner core has an overall diameter of about 0.5 inches or greater, or about 0.75 inches or greater, or about 0.8 inches or greater, or about 0.9 inches or greater, or about 1.0 inches or greater, or about 1.150 inches or greater, or about 1.25 inches or greater, or about 1.35 inches or greater, or about 1.39 inches or greater, or about 1.45 inches or greater, or an overall diameter within a range having a lower limit of about 0.25 or about 0.5 or about 0.75 or about 0.8 or about 0.9 or about 1.0 or about 1.1 or about 1.15 or about 1.2 inches and an upper limit of about 1.25 or about 1.3 or about 1.35 or about 1.39 or about 1.4 or about 1.44 or about 1.45 or about 1.46 or about 1.49 or about 1.5 or about 1.55 or about 1.58 or about 1.6 inches.

Each optional intermediate core layer may have an overall thickness within a range having a lower limit of about 0.005 inches to about 0.040 inches and an upper limit of about 0.05 inches to about 0.100 inches.

The cover typically has a thickness to provide sufficient strength, good performance characteristics, and durability. In one embodiment, the cover thickness is from about 0.02 inches to about 0.12 inches, preferably about 0.1 inches or less. For example, when part of a two-piece ball according to invention, the cover may have a thickness ranging from about 0.03 inches to about 0.09 inches. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.015 inches to about 0.06 inches. In another embodiment, the intermediate layer thickness is about 0.05 inches or less, more preferably about 0.01 inches to about 0.045 inches.

Hardness

The compositions of the invention may be used in any layer of a golf ball. Accordingly, the golf ball construction, physical properties, and resulting performance may vary depending on the layer(s) of the ball that include the compositions of the invention.

The cores included in the golf balls of the present invention may have varying hardnesses depending on the particular golf ball construction. In one embodiment, the core hardness ranges from about 50 Shore C to about 65 Shore C. In another embodiment, the core has a hardness ranging from about 50 Shore C to about 85 Shore C.

The intermediate layers of the present invention may also vary in hardness depending on the specific construction of the ball. In one embodiment, the surface hardness of the intermediate layer may be about 70 Shore D or less, or about 65 Shore D or less, or less than about 65 Shore D, or a Shore D hardness of from about 50 to about 65, or a Shore D hardness of from about 55 to about 60.

As with the core and intermediate layers, the cover hardness may vary depending on the construction and desired characteristics of the golf ball. In one embodiment, the cover may have a surface hardness of about 60 Shore D or less and/or a material hardness of about 60 Shore D or less. In another embodiment, the cover is a dual- or multi-layer cover including an inner or intermediate cover layer and an outer cover layer formed. The inner layer may have a surface hardness of about 70 Shore D or less, or about 65 Shore D or less, or less than about 65 Shore D, or a Shore D hardness of from about 50 to 65, or a Shore D hardness of from about 55 to 60. The outer cover layer may have a surface hardness ranging from about 20 Shore D to about 75 Shore D.

Compression

Compression is an important factor in golf ball design. For example, the compression of the core can affect the ball's spin rate off the driver and the feel. In fact, the compositions and methods of the present invention result in golf balls having increased compressions and ultimately an overall harder ball. The harder the overall ball, the less deformed it becomes upon striking, and the faster it breaks away from the golf club.

As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring.

Golf balls of the present invention typically have a compression of 40 or greater, or a compression within a range having a lower limit of 50 or 60 and an upper limit of 100 or 120.

Coefficient of Restitution

The coefficient of restitution or COR of a golf ball is a measure of the amount of energy lost when two objects collide. The COR of a golf ball indicates its ability to rebound and accounts for the spring-like feel of the ball after striking. As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

The crosslinked HNPs of the present invention demonstrate superior COR values. Without being bound to any particular theory, it is believed that the reduction in crystallinity, provided by crosslinking the HNPs of the present invention, increases the COR and durability when used in a golf ball layer. In addition, crosslinking the HNP is believed to reduce chain end mobility thereby further improving the COR at a given compression. In this aspect, the present invention contemplates golf balls having CORs from about 0.700 to about 0.850 or more at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Solid spheres (1.55 inches) formed of the compositions of the invention may have a COR of at least about 0.790, preferably at least about 0.800. For example, the COR of solid spheres formed from the compositions of the invention ranges from about 0.810 to about 0.830. In one embodiment, a solid sphere formed from the composition of the invention has a COR of about 0.800 to about 0.825. In another embodiment, the COR of the solid sphere ranges from about 0.805 to about 0.815.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising:
a cover layer formed from a crosslinked composition consisting essentially of:
an acid polymer comprising ethylene, a $C_{3-8}$ α, β-ethylenically unsaturated carboxylic acid, and a softening monomer;
an organic acid or salt thereof; and
a cation source present in an amount sufficient to neutralize at least 80% of all acid groups;
at least one crosslinking initiator and at least one liquid coagent, wherein the at least one crosslinking initiator comprises a peroxide, a carbon-carbon initiator, or combinations thereof; and
a core.

2. The golf ball of claim 1, wherein the $C_{3-8}$ α, β-ethylenically unsaturated carboxylic acid is selected from the group consisting of acrylic acid, methacrylic acid, ethacrylic acid, maleic acid, crotonic acid, fumaric acid, and itaconic acid.

3. The golf ball of claim 1, wherein the cation source is present in an amount sufficient to neutralize at least 90% of all acid groups.

4. The golf ball of claim 3, wherein the cation source is present in an amount sufficient to neutralize 100% of all acid groups.

5. The golf ball of claim 1, wherein the acid polymer is selected from the group consisting of ethylene/(meth) acrylic acid/n-butyl acrylate, ethylene/(meth) acrylic acid/methyl acrylate, and ethylene/(meth) acrylic acid/ethyl acrylate.

6. The golf ball of claim 1, wherein the carbon-carbon initiator has the following general structure:

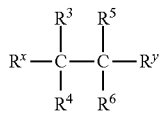

where each of $R_3$, $R_4$, $R_5$, and $R_6$ independently may be hydrogen, substituted and unsubstituted straight, branched, and cyclic, hydrocarbons (including aromatic hydrocarbons), and each of $R_x$ and $R_y$ independently may be substituted and unsubstituted aromatic hydrocarbons.

7. The golf ball of claim 1, wherein the at least one crosslinking initiator is a carbon-carbon initiator.

8. The golf ball of claim 1, wherein the at least one liquid coagent is selected from the group consisting of trimethylolpropane trimethacrylate, acrylate-terminated liquid polybutadiene, and combinations thereof.

9. A golf ball comprising:
a cover formed from a crosslinked composition consisting essentially of:
a thermoplastic highly-neutralized polymer material comprising:
an acid polymer comprising ethylene, a $C_{3-8}$ α, β-ethylenically unsaturated carboxylic acid, and a softening monomer;
an organic acid or salt thereof; and
a cation source present in an amount sufficient to neutralize at least 90% of all acid groups; and
at least one free radical initiator comprising a peroxide, a carbon-carbon initiator, persulfate, azo compound, benzophenone, hydrazide, or combinations thereof;
at least one liquid coagent, wherein the liquid coagent is selected from the group consisting of trimethylolpropane trimethacrylate, acrylate-terminated liquid polybutadiene, and combinations thereof;
and a melt flow modifier; and
a core.

10. The golf ball of claim 9, wherein the core has a hardness of about 50 Shore C to about 85 Shore C.

11. The golf ball of claim 9, wherein the peroxide is selected from the group consisting of dicumyl peroxide; n-butyl-4,4-di(t-butylperoxy) valerate; 1,1-di(t-butylperoxy) 3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; and benzoyl peroxide.

12. The golf ball of claim 9, wherein the softening monomer is an alkyl acrylate and methacrylate, where the alkyl groups have from 1 to 8 carbon atoms.

13. The golf ball of claim 9, wherein the melt flow modifier is selected from the group consisting of organic acids and salts thereof, polyamides, polyesters, polyacrylates, polyurethanes, polyethers, polyureas, polyhydric alcohols, non-fatty acids, and combinations thereof.

14. The golf ball of claim 9, wherein the at least one free radical initiator is a carbon-carbon initiator.

15. The golf ball of claim 14, wherein the carbon-carbon initiator has the following general structure:

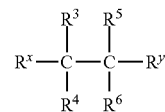

where each of $R_3$, $R_4$, $R_5$, and $R_6$ independently may be hydrogen, substituted and unsubstituted straight, branched, and cyclic, hydrocarbons (including aromatic hydrocarbons), and each of $R_x$ and $R_y$ independently may be substituted and unsubstituted aromatic hydrocarbons.

* * * * *